United States Patent Office 3,509,171
Patented Apr. 28, 1970

3,509,171
3-AMINO-1-CARBAMYL AND THIOCARBAMYL PYRROLIDINES
William John Welstead, Jr., Grover Cleveland Helsley, and Ying-Ho Chen, Richmond, Va., assignors to A. H. Robins Company, Incorporated, Richmond, Va., a corporation of Virginia
No Drawing. Filed Sept. 14, 1967, Ser. No. 667,672
Int. Cl. C07d 27/06
U.S. Cl. 260—326.3    11 Claims

ABSTRACT OF THE DISCLOSURE

Novel basic substituted pyrrolidines are disclosed which possess tranquilizing and hypotensive properties. The basic substituted pyrrolidines of the invention have the following formula:

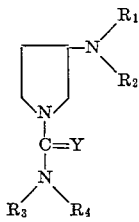

wherein $R_1$ is hydrogen, lower alkyl or lower alkanoyl, $R_2$ is lower alkyl, phenyl or substituted phenyl; $R_3$ and $R_4$ are each hydrogen, lower alkyl, phenyl or substituted phenyl; where $R_3$ and $R_4$ taken together with the adjacent nitrogen atom form a heterocyclic ring selected from the group of piperidino, pyrrolidino, piperazino, morpholino, quinolino and Y is oxygen, sulfur or amino, The invention also includes within its scope the acid addition salts and quaternary ammonium salts of the aforesaid compounds.

---

The present invention relates to basic substituted pyrrolidines, and more particularly to 3-substituted-amino-1-carbamoyl pyrrolidines, 3 - substituted-amino-1-thiocarbamoyl pyrrolidines and 3-substituted-amino-1-amidino pyrrolidines, to their acid addition and quaternary ammonium salts and to methods of making and using the same.

Still more particularly, this invention relates to compounds of the formula:

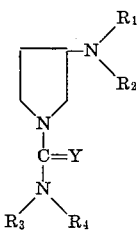

(I)

wherein $R_1$ is hydrogen, lower alkyl or lower alkanoyl, $R_2$ is lower alkyl, phenyl or substituted phenyl, $R_3$ is hydrogen, lower alkyl, phenyl or substituted phenyl, $R_4$ is hydrogen, lower alkyl, phenyl or substituted phenyl, where $R_3$ and $R_4$ taken together with the adjacent nitrogen atom form a heterocyclic ring selected from the group of piperidino, pyrrolidino, piperazino, morpholino and quinolino (dihydro or tetrahydro), Y is oxygen, sulfur or imino, and the acid addition salts thereof.

The compounds of the invention having the foregoing Formula I are useful in the preparation of medicinal agents. The compounds are useful because of their use in alleviating anxiety. Compounds which block aggressive behavior in fighting mice may be classified as major tranquilizers [DaVanzo, J. P. et al., Psychopharmacologia 9, 210 (1966)]. The novel compounds of Formula I are effective in blocking aggressive behavior in fighting mice and accordingly can be classified as major tranquilizers. The compounds of Formula I exhibit a low degree of toxicity, the $LD_{50}$ being in the range of 1700–1800 mg./kg.

The primary object of this invention is to provide new and valuable 3-substituted amino-1-carbamoyl pyrrolidines, -1-thiocarbamoyl pyrrolidines and -1-amidino pyrrolidines, processes for their production, said pyrrolidines being effective tranquilizing agents.

Another object of the present invention is to provide acid addition and quaternary ammonium salts of such new and valuable basic substituted pyrrolidines.

Still another object of the present invention is to provide valuable therapeutic preparations comprising said new basic substituted pyrrolidines and their acid addition salts, said therapeutic agents being useful as tranquilizing and hypotensive agents.

Another object of the present invention is to provide an advantageous, simple and very effective process of making such new and valuable basic substituted pyrrolidines and of preparing their acid addition and quaternary ammonium salts.

Other objects and advantageous features of the present invention will be apparent to one skilled in the art, and still other objects will become apparent from the following description and the appended claims.

In the foregoing Formula I and where they appear elsewhere throughout this specification, the terms have the following significance.

The term "lower alkyl" as used herein includes straight and branched chain radicals of up to eight carbon atoms inclusive and is exemplified by such groups as methyl, ethyl, propyl, isopropyl, butyl, tertiary butyl, amyl, hexyl, isoamyl, heptyl, octyl and the like.

The term "lower alkanoyl" has the formula:

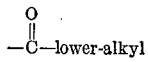

A "substituted phenyl" radical is a phenyl radical substituted by one or more substituents which are not reactive or otherwise interfering under the conditions or reaction in the processes for making the compounds. Such substituents include lower alkyl, lower alkoxy, trifluoromethyl, nitro, halo and the like. The substituted phenyl radicals have preferably no more than one to three substituents such as those given above and, furthermore, these substituents can be in various available positions of the phenyl nucleus and when more than one substituent is present, can be the same or different and can be in various position combinations relative to each other. The lower alkyl and lower alkoxy substituents each have preferably from one to four carbon atoms which can be arranged as straight or branched chains. A total of nine carbon atoms in all ring substituents, making a total of fifteen carbon atoms in the radical is the preferred maximum.

This invention also includes acid addition salts of the bases of Formula I with organic and inorganic acids. Such salts are easily prepared by methods known in the art. When the compounds are to be used as intermediates for preparing other compounds or for any non-pharmaceutical use, the toxicity or non-toxicity of the salt is immaterial; when the compounds are to be used as pharmaceuticals, they are most conveniently used in the form of nontoxic acid addition salts. Both toxic and nontoxic salts are therefore within the purview of the invention. The acids which can be used to prepare the preferred nontoxic acid addition salts are those which produce, when combined with the free bases, salts whose anions are relatively innocuous in therapeutic doses of the salts, so that beneficial physiological properties inherent in the free bases are not vitiated by side effects ascribable to the anions.

The base is reacted with the calculated amount of organic or inorganic acid in a solvent miscible with water, such as ethanol or isopropanol, with isolation of the salt by concentration and cooling, or the base is reacted with an excess of the acid in a solvent immiscible with water, such as ethyl ether or isopropyl ether, with the desired salt separating directly. Exemplary of such organic salts are those formed with citric, acetic, lactic, maleic, fumaric, benzoic, tartaric, ascorbic, pamoic, succinic, methanesulfonic, malic, citraconic, itaconic acid and the like. Exemplarly of such inorganic salts are those formed with hydrochloric, hydrobromic, sulfuric, phosphoric and nitric acids.

Quaternary ammonium salts of the organic bases of this invention are generally readily prepared and constitute a useful form of the invention. Such salts can be made with alkyl or hydroxyalkyl halides such as methyl chloride, methyl bromide, methyl iodide, ethyl bromide, propyl chloride, ethylene bromohydrin, propylene bromohydrin, glycerol monochlorohydrin, and related aliphatic halides. Quaternary bases may also be prepared from arylmethyl halides such as benzyl chloride, naphthylmethyl chloride, and the like. Aliphatic esters of sulfuric acid or aromatic sulfonic acids are also suitable, as for example, dimethyl sulfate, diethyl sulfate, ethyl toluenesulfonate, and propyl benzenesulfonate.

The novel compounds of this invention, i.e., the 3-mono and 3 - di-substituted-amino - 1 - carbamoylpyrrolidines, 3-mono and 3-di-substituted-amino - 1 - thiocarbamoylpyrrolidines and 3-mono and 3-di-amino-1-amidinopyrrolidines, are prepared by reacting a compound of the formula:

(II)

wherein $R_1$ and $R_2$ have the meanings given hereinabove except that $R_1$ cannot be lower alkanoyl, and wherein W is 3-pyrrolidinyl, with a compound having formula as set out in the following:

(III)

(IV)

ZNCY (V)

(VI)

wherein $R_3$ and $R_4$ indicate the same substituents as stated above, Y is oxygen or sulfur, Z is K, Na or $NH_4$ and X is a halogen atom, preferably chlorine.

When $R_1$ is Formula I is lower alkanoyl, the compound of Formula I is prepared as more fully described hereinafter in Examples 19 and 20.

Representative of the 3-substituted-amino-pyrrolidines of Formula II within the scope of the invention are the following: 3-anilinopyrrolidine, 3 - (N - methylanilino)-pyrrolidine, 3-(N-butylamino)-pyrrolidine, 3-(m-trifluoromethylanilino)-pyrrolidine and the like. The latter compounds are readily obtained according to the methods disclosed in copending application of Norman D. Dawson, Ser. No. 536,264 filed Mar. 22, 1966, now United States Patent No. 3,433,801, and co-pending application of Norman D. Dawson and Albert D. Cale, Jr., Ser. No. 536,291 filed Mar. 22, 1966, now United States Patent No. 3,433,802.

Instances of suitable N,N-disubstituted carbamoyl chlorides and N,N-disubstituted thio-carbamoyl chlorides for use in preparing the compounds of the invention include: di-p-tolyl carbamoyl chloride, diphenyl thiocarbamoyl chloride, N-methylanilino carbamoyl chloride, N-methylanilino thiocarbamoyl chloride and the like. The carbamoyl and thiocarbamoyl chlorides are prepared by the reaction of a suitable secondary amine with phosgene or thiophosgene in a dry organic solvent as, for example, benzene containing an acid binding material as, for example, a metal carbonate to bind the hydrogen chloride formed in the reaction. The reaction mixture is filtered and the filtrate containing the crude N,N-disubstituted carbamoyl chloride or N,N-disubstituted thiocarbamoyl chloride is used without isolation or further purification.

The preparation of the novel compounds of the present invention by the reaction of a 3-disubstituted aminopyrrolidine of Formula II and an alkyl or aryl isocyanate or an alkyl or aryl isothiocyanate of Formula III is preferably carried out in a dry organic solvent as, for example, benzene. Other solvents which can be used include toluene, xylene, chloroform, methylene chloride and the like. The reaction is generally carried out from about 0° C. to the reflux point of the solvent used, preferably from about 0° C. to 25° C. higher temperatures being used for less reactive arylisocyanates or arylisothiocyantes. The solvents are evaporated and the residual crude oils or solids crystallized in appropriate solvents.

The reaction of the starting 3-disubstituted aminopyrrolidine compounds of Formula II and the disubstituted carbamoyl or thiocarbamoyl halide compounds of Formula IV to prepare the novel compounds of Formula I is carried out in an organic solvent as, for example, benzene or chloroform at about room temperature, an acid binding agent as, for example, sodium carbonate being added at the start of the reaction or after the reaction is essentially complete. The solvent is removed after filtration to remove solids and the residual material is crystallized from an appropriate solvent or if the product is an oil it is converted to a solid acid addition salt which is purified by recrystallization.

In an alternate procedure a starting compound of Formula II is added to a chloroform-water mixture containing an equivalent of sodium carbonate. A chloroform solution of the N,N-disubstituted carbamoylchloride or the N,N-disubstituted thiocarbamoyl chloride is added dropwise to the stirred heterogeneous solution at about room temperature. After completion of the reaction, the layers are separated and the product isolated from the organic layer as described above.

The reaction between the starting compounds of Formula II and the isocyanate or isothiocyanate compounds of Formula V and the methylthiopseudourea of Formula VI is carried out in an aqueous acidic solution or in an acidic alcohol-water solution from room temperature to the reflux point of the solvent system used. The products generally separate from the cooled reaction mixtures as crystalline solids which are readily separated by filtration and the crystalline materials thus isolated are further purified by recrystallization from a suitable solvent.

The following examples serve to illustrate the present invention without, however, limiting the same thereto.

EXAMPLE I 3-(N-methylanilino)-1-ethylthiocarbamoylpyrrolidine

To a solution of 13.6 g. (0.08 mole) of 3-(N-methylanilino) - pyrrolidine in 100 ml. of dry benzene, there were added 6.4 g. (0.08 mole) of ethylisothiocyanate with vigorous mixing and the mixture allowed to stand at room temperature overnight. The reaction mixture was then poured into 350 ml. of isopropyl ether with stirring. The white crystalline solid which precipitated was collected by filtration and washed with 350 ml. of hot isopropyl ether, yielding 17.3 g. of the pure 3-(N-methylanilino)-1-ethylthiocarbamoylpyrrolidine which melted at 84–85° C.

EXAMPLE II 3-(N-methylanilino)-1-(n-butyl)-thiocarbamoyl-pyrrolidine hydrochloride To 100 ml. of isopropanol which contained 8.5 g. (0.05 mole) of 3-(N-methylanilino)-pyrrolidine, 5.5 g. (0.05 mole) of n-butylisothiocyanate was added and the mixture was allowed to stand at room temperature for 6 hours. The reaction was exothermic. A small amount of isopropyl ether and ethereal hydrogen chloride was added to give a white crystalline solid. The white crystalline solid was separated by filtration and washed with isopropylether. The water soluble hydrochloride salt (11.0 g., 67.5%) melted at 176–178° C. The infrared and nuclear magnetic resonance spectra of the white crystalline hydrochloride salt agreed with the proposed structure.

Analysis.—Calculated for $C_{16}H_{26}N_3SCl$ (percent): N, 12.81. Found (percent): N, 12.50.

EXAMPLE III 3-(N-methylanilino)-1-(m-trifluoromethylphenyl)-thiocarbamoyl-pyrrolidine hydrochloride To 75 ml. of isopropanol which contained 3.4 g. (0.02 mole) of 3-(N-methylanilino)-pyrrolidine, there was added 4.06 g. (0.02 mole) of m-trifluoromethylphenyl isothiocyanate and the mixture allowed to stand at room temperature overnight. The mixture was heated at 75° C. for four hours, cooled, diluted with one liter of isopropyl ether and then treated with 15 ml. of ethereal hydrogen chloride. The white crystalline precipitate was collected by filtration and recrystallized using an acetone-isopropyl ether mixture to give 3 g. of the hydrochloride salt which melted at 181–182.5° C.

The infrared and nuclear magnetic resonance spectra of the white crystalline salt agreed with the proposed structure.

Analysis.—Calculated for $C_{19}H_{20}N_3SF$ (percent): N, 11.07. Found (percent): N, 10.90.

EXAMPLE IV 1-amidino-3-(N-methylanilino)-pyrrolidine hemisulfate

A solution of 5 g. (0.028 mole) of 3-(N-methylanilino)-pyrrolidine and 4 g. (0.028 mole) of s-methyl-isothiourea sulfate in a mixture of 50 ml. of 95% ethanol and 50 ml. of water was refluxed for 4 hours until the evolution of methyl mercaptan gradually subsided. After cooling, 3.1 g. of product precipitated. The filtrate was evaporated under reduced pressure to an oil which was taken up in alcohol. After cooling at 0° C. an additional 1.6 g. of product was obtained. The product sintered at about 275° C. but did not melt below 300° C.; total yield. 4.7 g. (61%).

Analysis.—Calculated for $C_{24}H_{38}N_8SO_4$ (percent): C, 53.91; H, 7.16. Found (percent): C, 53.89; H, 7.37.

EXAMPLE V 1-amidino-3-anilinopyrrolidine hemisulfate

A solution of 5 g. (0.03 mole) of 3-anilinopyrrolidine and 4.3 g. (0.03 mole) of a s-methyl-isothiourea sulfate in a mixture of 50 ml. of 95% alcohol and 50 ml. of water was refluxed for 2 hours during which time the evolution of methyl mercaptan subsided. After cooling overnight at 0° C., the product which had formed was filtered off and washed with ice water. The yield amounted to 3.3 g. (44%). The product melted with decomposition at about 335° C. An analytical sample was recrystallized from an isopropanol-water mixture.

Analysis.—Calculated for $C_{22}H_{34}N_8O_4S$ (percent): C, 52.15; H, 6.76; N, 22.12. Found (percent): C, 52.20; H, 6.92; N, 22.23.

EXAMPLE VI 1-carbamoyl-3-(N-methylanilino)-pyrrolidine

To 50 g. (0.028 mole) of 3-(N-methylanilino)-pyrrolidine in 28 ml. of 1 N hydrochlloric acid, was added a solution of 1.68 g. (0.028 mole) of ammonium cyanate in 5 ml. of water. The reaction mixture was stirred at room temperature for 2 hours during which time a crystalline precipitate appeared. After cooling several hours at 5° C., the precipitate was filtered, washed with water and air dried. The product had a tendency to crystallize in the form of a hydrate from a benzene-isooctane mixture. This was avoided by dissolving the compound in benzene, azeotroping off any water present and causing a rapid precipitation with excess isooctane. The pure product melted at 130–132° C. The yield amounted to 3.8 g. (62%).

Analysis.—Calculated for $C_{12}N_{17}N_3O$ (percent): C, 65.72; H, 7.81; N, 19.16. Found (percent): C, 65.63; H, 7.84; N, 18.96.

EXAMPLE VII 1-carbamoyl-3-anilinopyrrolidine

To 5 g. (0.031 mole) of 3-anilinopyrrolidine in 31 ml. of 1 N hydrochloric acid was added a solution 2.5 g. (0.031 mole) of potassium cyanate in 5 ml. of water. After stirring 30 minutes, an oil began to separate. The mixture was stirred at room temperature overnight under a nitrogen atmosphere. Addition of chloroform caused the oil to solidify. The suspension was filtered and the product recrystallized from water. The yield amounted to 3.5 g. (57%); M.P. 133–135° C.

Analysis.—Calculated for $C_{11}H_{15}N_3O$ (percent): C, 64.36; H, 7.37; N, 20.47. Found (percent): C, 64.61; H, 7.43; N, 20.44.

EXAMPLE VIII 3-(N-methylanilino)-1-methylcarbamoylpyrrolidine

A cooled solution of 5 g. (0.028 mole) of 3-(N-methylanilino)-pyrrolidine in 25 ml. of dry benzene was treated all at once with 1.6 g. (0.028 mole) of methylisocyanate in 25 ml. of dry benzene. After standing for 1 hour at room temperature, the benzene was removed on a rotating evaporator yielding an oil which crystallized on addition of ether. The yield of product amounted to 6.4 g. 97%); melting point 126–128° C. Recrystallization of an analytical sample from benzene-isooctane did not change the melting point.

Analysis.—Calculated for $C_{13}H_{19}N_3O$ (percent): C, 66.92; H, 8.21; N, 18.01. Found (percent): C, 67.10; H, 8.30; N, 17.94.

EXAMPLE IX 3-(N-methylanilino)-1-phenylcarbamoylpyrrolidine

A stirred solution of 8 g (0.045 mole) of 3-(N-methylanilino-pyrrolidine in 100 ml. of dry benzene was treated dropwise with 5.4 g. (0.045 mole of phenylisocyanate in 50 ml. of dry benzene. The resultant mixture was stirred an additional 30 minutes, the solvent then removed on a rotating evaporator. The resulting oil was taken up in hot benzene, charcoaled, filtered and treated with ether. After cooling 10.8 g. (81%) of product precipitated. Recrystallization from benzene-isooctane gave 10 g. of pure product melting at 142–144° C.

Analysis.—Calculated for $C_{18}H_{21}N_3O$ (percent): C, 73.19; H, 7.17; N, 14.23. Found (percent): C, 73.21; H, 7.13; N, 14.14.

EXAMPLE X 3-(N-methylanilino)-1-(4-methoxy)-pyrrolidine

A solution of 8 g. (0.045 mole) of 3-(N-methylanilino)-pyrrolidine in 100 ml. of dry benzene was stirred under a nitrogen atomsphere while 6.7 g. (0.045 mole) of 4-methoxyphenyl isocyanate in 50 ml. of dry benzene was added dropwise. The mixture was stirred for 30 minutes and then concentrated to an oil. The oil crystallized from benzene-isooctane and melted at 107–109° C. The yield amounted to 10.1 g. (69%). The analytical sample melted at 108–109.5° C. after recrystallization from the same solvent system.

*Analysis.*—Calculated for $C_{19}H_{23}N_3O_2$ (percent): C, 70.13; H, 7.12; N, 12.91. Found (percent): C, 70.27; H, 7.07; N, 12.07.

EXAMPLE XI 3-(N-methylanilino)-1-diphenylcarbamoylpyrrolidine

A solution of 8 g. (0.045 mole) of 3-(N-methylanilino)-pyrrolidine in 50 ml. of chloroform was added to a solution of 10 g. of sodium carbonate in 50 ml. of water. The stirred mixture was then treated dropwise with 10.5 g. (0.045 mole) of diphenylcarbamoyl chloride in 50 ml. of chloroform and the stirring continued overnight at room temperature. The chloroform layer was separated, dried over magnesium sulfate and evaporated to a crystalline solid. Recrystallization from benzene-isooctane gave 13.6 g. (81%) of product melting at 125–126° C.

*Analysis.*—Calculated for $C_{24}H_{25}N_3O$ (percent): C, 77.60; H, 6.78; N, 11.31. Found (percent): C, 77.77; H, 6.76; N, 11.27.

EXAMPLE XII 1-diethylcarbamoyl-3-(N-methylanilino)-pyrrolidine dihydrochloride A mixture of 10 g. (0.057 mole) of 3-(N-methylanilino)-pyrrolidine, 7.7 g. (0.057 mole) of diethylcarbamoyl chloride and 10 g. of sodium carbonate in 100 ml. of chloroform was stirred at room temperature for 16 hours. The mixture was treated with 50 ml. of water and stirred an additional 30 minutes. The organic layer was separated, dried over magnesium sulfate and evaporated under reduced pressure to an oil which would not crystallize. The oil (17 g.) was dissolved in acetone and treated with ethereal hydrogen chloride. On standing 16 g. (81%) of product precipitated which melted at 154–160° C. (decomp.). Recrystallization from isopropanol-isopropyl ether did not change the melting point. The salt analyzed as a dihydrochloride

*Analysis.*—Calculated for $C_{16}H_{27}Cl_2N_3O$ (percent): C, 55.17; H, 7.81; N, 12.06. Found (percent): C, 55.39; H, 7.85; N, 12.33.

EXAMPLE XIII 3-anilino-1-diethylcarbamoylpyrrolidine

A solution of 4 g. (0.025 mole) of 3-anilinopyrrolidine in 25 ml. of chloroform was treated with 5 g. of sodium carbonate in 25 ml. of water. The stirred suspension was then treated dropwise with 3.4 g. (0.025 mole) of diethylcarbamoyl chloride in 25 ml. of chloroform and stirred 30 minutes. The organic layer was separated, dried over magnesium sulfate and evaporated to an oil which solidified on standing. Recrystallization from isooctane produced 5.4 g. (84% of product melting at 102–104° C.).

*Analysis.*—Calculated for $C_{15}H_{23}N_3O$ (percent): C, 68.93; H, 8.87; N, 16.08. Found (percent): C, 68.84; H, 8.92; N, 15.98.

EXAMPLE XIV 3-anilino-1-diphenylcarbamoylpyrrolidine

A solution of 4 g. (0.025 mole) of 3-anilinopyrrolidine in 25 ml. of chloroform was treated with 5 g. of sodium carbonate in 25 ml. of water. The stirred suspension was then treated dropwise with 5.7 g. (0.025 mole) of diphenylcarbamoyl chloride in 25 ml. of chloroform. After the addition was completed, the mixture was stirred an additional 30 minutes. The chloroform layer was separated, dried over magnesium sulfate and evaporated under reduced pressure to an oil which solidified slowly. Recrystallization from benzene-isooctane gave 7.6 g. (85%) of product which melted at 124–126° C.

*Analysis.*—Calculated for $C_{23}H_{23}N_3O$ (percent): C, 77.28; H, 6.46; N, 11.76. Found (percent): C, 77.49; H, 6.51; N, 11.69.

EXAMPLE XV 3-anilino-1-phenylcarbamoylpyrrolidine

A stirred solution of 5 g. (0.031 mole) of 3-anilinopyrrolidine in 25 ml. of chloroform was cooled ot 0° C. and treated dropwise with 3.65 g. (0.031 mole) of phenylisocyanate in 25 ml. of chloroform. After stirring an additional 30 minutes the chloroform was removed by evaporation and yielded an oil. Crystallization from benzene-isooctane gave 7.2 g. (83%) of product melting at 112–114° C.

*Analysis.*—Calculated for $C_{17}H_{19}N_2O$ (percent): C, 72.57; H, 6.81; N, 14.94. Found (percent): C, 72.43; H, 6.82; N, 15.19.

EXAMPLE XVI 3-(N-methylanilino) - 1 - (3,4,5-trimethoxyphenylcarbamoyl)pyrrolidine hydrochloride A stirred solution of 8 g. (0.0455 mol) of 3-(N-methylanilino)-pyrrolidine in 100 ml. of dry benzene was treated dropwise with 9.5 g. (0.0455 mole) of 3,4,5-trimethoxyphenylisocyanate in 50 ml. of dry benzene. The mixture was stirred for 90 minutes at room temperature after which time the solvent was removed. The resulting oil would not crystallize. The oil was dissolved in isopropanol and treated with ethereal hydrogen chloride followed by isopropyl ether. The resulting solid 17 g. (89%) melted at 176–178° C. Recrystallization from isopropanol-isopropyl ether did not raise the melting point.

*Analysis.*—Calculated for $C_{21}H_{27}N_3O_4$ (free base) (percent): C, 65.43; *H,* 7.06; N, 10.90. Found (percent): C, 65.74; H, 7.14; N, 11.27.

*Analysis.*—Calculated for $C_{21}H_{28}N_3O_4Cl$(hydrochloride), (percent): C, 59.78; H, 6.69; N, 9.96. Found (percent): C, 59.16; H, 6.94; N, 9.83.

EXAMPLE XVII 1-diphenylcarbamoyl - 3-(2-methoxyanilono)-pyrrolidine

A solution of 10 g. (0.052 mole) of 3-(2-methoxyanilino)-pyrrolidine in 50 ml. of chloroform was mixed with a solution of 15 g. of potassium carbonate in 50 ml. of water. To this stirred mixture was added 12. g. (0.052 mole) of diphenylcarbamoyl chloride in 50 ml. of chloroform. After addition the mixture was stirred for 30 minutes. The chloroform layer was separated, dried over magnesium sulfate and evaporated to an oil (22 g.). The crude oil was dissolved in benzene and placed on a column containing 450 g. of 60–100 mesh magnesium silicate. The pure product eluted with 5% acetone-benzene. The product slowly crystallized on standing after recrystallization from benzeneisooctane and yielded 14.9 g. (77%) of solid melting at 72–74° C.

*Analysis.*—Calculated for $C_{24}H_{25}N_3O_2$ (percent): C, 74.39; H, 6.50; N, 10.85. Found (percent): C, 74.12; H, 6.56; N, 10.62.

EXAMPLE XVIII 3-(N-methylanilino) - 1 - [N-phenyl - N - (n-propyl)-carbamoyl]-pyrrolidine hydrochloride A mixture which contained 9.6 g. (0.05 mole) of N-phenyl-N-(n-propyl)-carbamoyl chloride and 8.5 g. (0.05 mole) of 3-(N-methylanilino)-pyrrolidine and 150 ml. of toluene was allowed to stand at room temperature overnight and was then heated at 75° C. for 3½ hours with stirring. The resulting mixture was cooled to room temperature and extracted with 200 ml. 2 N hydrochloric acid. The aqueous acidic solution was made basic and was extracted twice with 100 ml. ether. The combined ether extracts were dried over $Na_2SO_4$, filtered and then treated with 3 ml. of ethereal hydrogen chloride. The white crystalline solid was filtered and recrystallized from isopropanol yielding 6.0 g. of the hydrochloride salt which melted at 132–135° C. Yield 33.3%. The infrared and nuclear magnetic resonance spectrum of this product agreed with the proposed structure.

*Analysis.*—Calculated for $C_{21}H_{28}N_3O_1Cl$ (percent): N, 11.24. Found (percent): N, 11.07.

EXAMPLE XIX 1-diphenylcarbamoyl - 3 - [N-(2-methoxylphenyl)-propionamido]-pyrrolidine A stirred mixture of 83. g. (0.02 mole) of 1-diphenylcarbamoyl-3-(2-methoxyanilino)-pyrrolidine and 10 g. of potassium carbonate in 75 ml. of chloroform was treated with 2.28 g. (0.024 mole) of propionyl chloride (added all at once) and allowed to stir for 2 hours. An additional 2.28 g. of propionyl chloride was then added and the mixture was stirred overnight. The mixture was then treated with another 2.28 g. of propionyl chloride and stirred for a further 30 minutes. The mixture was treated with 50 ml. of water and 50 ml. of 3 N sodium hydroxide and stirring continued for 30 more minutes. The chloroform layer was separated, dried over magnesium sulfate and evaporated under reduced pressure to an oil. The oil was dissolved in benzene and chromatographed on 250 g. of 60–100 mesh magnesium silicate. The column was eluted with benzene containing increasing amounts of acetone and yielded 9 g. (98%) of pure product. The product solidified on standing and was recrystallized from benzeneisooctane. Yield amounted to 6.4 g., M.P. 114–116° C.

*Analysis.*—Calculated for $C_{27}H_{29}N_3O_3$ (percent): C, 73.11; H, 6.59; N, 9.47. Found (percent): C, 73.44; H, 6.77; N, 9.58.

EXAMPLE XX 1-diphenylcarbamoyl-3-(N-phenylpropionamido)-pyrrolidine

A stirred mixture of 7.1 g. (0.02 mole) of 1-diphenylcarbamoyl-3-anilinopyrrolidine and 10 g. of potassium carbonate in 50 ml. of chloroform was treated dropwise with 1.9 g. (0.02 mole) of propionyl chloride in 25 ml. of chloroform. The mixture was allowed to stir overnight. An additional 2 g. of propionyl chloride was then added and the mixture stirred another 4 hours. The resultant mixture was treated with 90 ml. of water and 10 ml. of 3 N sodium hydroxide, then stirred for 30 minutes. The chloroform layer was separated, dried over magnesium and evaporated under reduced pressure to an oil (9.8 g.). The impure product was dissolved in benzene and chromatographed on 200 g. of 60–100 mesh magnesium silicate. Pure product was eluted with benzene containing increasing amounts of acetone; 7.7 g. (94%). The product was recrystallized from ethyl acetate-isooctane and yielded 4.1 g. of pure product which melted at 110–113° C. The compound formed a benzene solvate when recrystallized from benzene-isooctane.

*Analysis.*—Calculated for $C_{26}H_{27}N_3O_2$ (percent): C, 75.52; H, 6.58; N, 10.16. Found (percent): C, 75.78; H, 6.58; N, 10.25.

EXAMPLE XXI 3-diethylamino-1-(m-trifluoromethylphenylcarbamoyl)-pyrrolidine hydrochloride To a cooled (about 10° C.) stirred solution of 4.3 g. (0.03 mole) of 3-diethylaminopyrrolidine in 60 ml. of dry benzene there was added over a period of 15 minutes a solution of 5.6 g. (0.03 mole) of m-trifluoromethylphenyl isocyanate in 15 ml. of dry benzene. After the addition was completed, the solution was stirred for 15 minutes at room temperature and the solvent evaporated. The residual oil which crystallized on standing weighed 8.5 g. and after it had been triturated with isooctane, melted at 100–105° C.

The free base was dissolved in isopropanol and treated with ethereal hydrogen chloride. The white crystalline salt which formed weighed 6.5 g. (60% yield) and melted at 211.5–214° C.

*Analysis.*—Calculated for $C_{16}H_{23}ClF_3N_3O$ (percent): C, 52.53; H, 6.34; N, 11.49. Found (percent): C, 52.37; H, 6.32; N, 11.76.

EXAMPLE XXII 1-(m-chlorophenylcarbamoyl)-3-diethylaminopyrrolidine hydrochloride To a cooled (about 10° C.) stirred solution of 4.3 g. (0.03 mole) of 3-diethylaminopyrrolidine in 60 ml. of dry benzene there was added over a period of 15 minutes a solution of 4.6 g. (0.03 mole) of m-chlorophenyl isocyanate in 15 ml. of dry benzene. After the addition had been completed, the solution was stirred for 15 minutes at room temperature and the solvent evaporated. The residual oil which crystallized on standing was recrystallized from a ligroin-benzene mixture. The product melted at 97–102° C. and weighed 7.2 g. (81% yield) after it was recrystallized from an isooctane-benzene mixture.

A portion of the free base (1.0 g.) in 25 ml. of isopropanol was treated with ethereal hydrogen chloride. The white crystalline product which formed on standing melted at 187–189° C. and weighed 1.0 g. after it was recrystallized again from isopropanol.

*Analysis.*—Calculated for $C_{15}H_{23}Cl_2N_3O$ (percent): C, 54.22; H, 6.98; N, 12.65. Found (percent): C, 54.41; H, 7.20; N, 12.71.

EXAMPLE XXIII 1-diphenylcarbamoyl-3-diethylaminopyrrolidine dioxalate

To a stirred suspension of 4.3 g. (0.03 mole) of 3-diethylaminopyrrolidine and 10 g. of potassium carbonate in 100 ml. of chloroform there was added slowly a solution of 7.0 g. (0.03 mole) of diphenylcarbamoyl chloride in 50 ml. of chloroform. After the addition was complete, the mixture was stirred at ambient temperature for two days. The suspension was then filtered and the solvent evaporated. The residual oil was dissolved in 3 N hydrochloric acid and the acidic solution extracted with ether. The aqueous layer was separated and made basic with 3 N sodium hydroxide. After the oil which separated was extracted with benzene and the combined extracts were washed with water, the solvent was evaporated. The residual oil which weighed 7.6 g. gave one spot in thin layer chromatography.

The free base (7.2 g., 0.021 mole) was added to a solution of 5.4 g. (0.043 mole) of oxalic acid dihydrate in 100 ml. of hot isopropanol. The mixture was heated for several minutes, filtered, and upon cooling, a white crystalline product formed. The salt weighed 6.2 g. (40% yield) and melted at 136.5–139.5° C.

*Analysis.*—Calculated for $C_{25}H_{31}N_3O_9$ (percent): C, 58.02; H, 6.04; N, 8.12. Found (percent): C, 58.11; H, 6.00; N, 8.10.

EXAMPLE XXIV 3-diethylamino-1-(N-methyl-N-phenylcarbamoyl)-pyrrolidine hydrochloride To a stirred solution of 4.3 g. (0.030 mole) of 3-diethylaminopyrrolidene in 50 ml. of chloroform, there was added slowly 5.1 g. (0.030 mole) of N-methyl-N-phenylcarbamoyl chloride. After the addition was complete, the mixture was stirred for two days at ambient temperature and finally heated at reflux for one hour. After the solvent was evaporated, the residual oil was dissolved in 3 N hydrochloric acid and extracted with ether. The aqueous layer was then separated and made basic with 3 N sodium hydroxide. The oil which separated was extracted with benzene and the combined extracts evaporated under reduced pressure leaving 7.6 g. of residual oil which gave one spot in thin layer chromatography experiments.

To a solution of the free base in isopropanol there was added ethereal hydrogen chloride and the white crystalline product which formed was recrystallized from an isopropanol-ethyl ether mixture. The salt weighed 5.5 g. (59% yield) and melted at 162–164° C.

*Analysis.*—Calculated for $C_{16}H_{26}ClN_3O$ (percent): C, 61.62; H, 8.40; N, 13.47. Found (percent): C, 61.48; H, 8.47; N, 13.54.

EXAMPLE XXV

1-(N-cyclopentyl-N-phenylcarbamoyl)-3-(N-methylanilino)-pyrrolidine

A mixture of 2.23 g. (0.01 mole) of N-cyclopentyl-N-phenylcarbamoyl chloride, 1.77 g. (0.01 mole) of 3-(N-methylanilino)-pyrrolidine and 250 ml. of toluene was heated at 70–75° C. for 8 hours and filtered at room temperature. The filtrate was extracted with 250 ml. of 3 N hydrochloric acid. The acidic aqueous solution was made basic and extracted with isopropyl ether, dried over $Na_2SO_4$, evaporated under reduced pressure to dryness providing 3.5 g. of the product. (Yield—89%). The infrared and nuclear magnetic resonance spectrum of the product agreed with the proposed structure.

*Analysis.*—Calculated neutral equivalent (percent): 363.48. Found (percent): 359.00.

EXAMPLE XXVI

3-(N-methylanilino)-1-(1,2,3,4-tetrahydroquinolinylcarbamoyl)-pyrrolidine

A mixture of 3.7 g. (0.022 mole) of 1,2,3,4-tetrahydroquinoline - 1 - carbonyl chloride, 3.5 g. (0.022 mole) of 3-(N-methylanilino)-pyrrolidine and 150 ml. of isopropanol was allowed to stand at room temperature overnight. The resulting mixture was heated in a steam bath for 4 hours and filtered. The filtrate was concentrated to dryness under reduced pressure. The viscous, semi-solid residue was dissolved in methanol, the methanol solution was treated with 2 ml. of 6 ml. of 6 N sodium hydroxide. and diluted with water to a volume of 450 ml. A white crystalline solid precipitated on standing at room temperature. The white crystalline solid was recrystallized from isopropanol and water providing 5 g. of the product which melted at 104–106° C. (Yield 68.5%).

*Analysis.*—Calculated neutral equivalent (percent): 335.43. Found (percent): 335.43.

The infrared nuclear magnetic resonance spectrum agreed with the proposed structure.

The new compounds described and claimed herein are effective tranquilizing and hypotensive agents. In contrast to known compounds having these effects they are not very toxic. The $LD_{50}$ in mice has been found to be about 1700 to 1800 mg./kg.

The compounds of the invention and specifically the compounds hereinafter set out were evaluated with respect to their activity as "major" tranquilizers. The test procedure employed was the procedure of DaVanzo, J. P., et al., Psychopharmacologia 9, 210 (1966) for determining the effectiveness of compounds in blocking aggressive behavior in fighting mice. Each compound was tested at the dose level indicated in five different mice, the data, as reported, representing the results for the group of animals in each instance. The compounds employed and the results of the tests are set out in the table which follows:

TABLE—FIGHTING MICE DATA

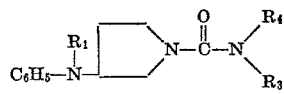

| No. | $R_1$ | $R_3$ | $R_4$ | No. protected/No. tested (20 mg./kg. IP) |
|---|---|---|---|---|
| 1 | $CH_3$ | $C_6H_5$ | $C_6H_5$ | * 3/5 |
| 2 | H | $C_6H_5$ | $C_6H_5$ | * 2/5 |
| 3 | $CH_3$ | H | $C_6H_5$ | * 2/5 |
| 4 | H | H | $C_6H_5$ | 1/5 |
| 5 | H | $C_2H_5$ | $C_2H_5$ | 1/5 |

*$LD_{50}$, 778 mg./kg. (mice).

As stated herein before, the new basic substituted pyrrolidines are tranquilizing agents. The compounds in accordance with the invention are indicated for use wherever anti-psychotic and anti-neurotic drugs would be helpful. They can be employed with beneficial effects in the treatment of schizophrenic reactions, other functional psychosis and neuroses and in the management of brain disorders. Usually they are administered orally, for instance, in the form of tablets, pills, dragees, or other compressed form, or as powders, preferably filled in gelatin capsules and the like, or also in liquid form, for instance, as aqueous solution, syrup or the like, or in case of difficulty soluble compounds, as emulsions, suspensions and the like.

The new compounds can also be administered parenterally, for instance, by subcutaneous, intramuscular, or intravenous injection. For this purpose, they are employed in the form of injectable solutions in water or isotonic salt solutions.

Rectal suppositories containing said compounds may also be employed for therapeutic purposes.

The basic pyrrolidines according to the present invention are preferably not used as such in undiluted form but are diluted with suitable diluting agents which are conventionally used as pharmaceutical carriers. Such dilutions allow better and more economical use to be made thereof.

For making tablets, dragees, pills, powders, and other solid forms of medication, uniform dispersion of the active compound throughout the carrier is required. Such a fine and uniform dispersion is achieved, for instance, by intimately mixing and milling the basic pyrrolidines according to the present invention or their acid addition salts with a solid pulverulent diluent and, if required, with tableting adjuvants to the desired degree of fineness. One may also impregnate the finely pulverized, solid carrier, while milling, with a solution of the active compound in water or a suitable solvent and removing the solvent during such milling.

As solid pharmaceutical carriers, various inert pulverulent distributing agents, as they are conventionally used, in the pharmaceutical industry, may be employed.

Solid diluents which are admixed to the active compounds, especially when preparing tablets, pills, dragees, and other compressed forms, or powders to be placed in capsules of absorbable material, such as the usual gelatin capsule, or in powder packets, are the commonly used diluting agents, such as cornstarch, dextrose, lactose, sugar and the like. For making tablets and other compressed medication forms, binders, such as pectins, gelatin, gum arabic, methyl cellulose, yeast extract, agar, tragacanth, and lubricants, such as magnesium stearate, calcium stearate, stearic acid, talc and the like, are used.

The amount of basic pyrrolidine present in such preparation may, of course, vary. It is necessary that the active ingredient be contained therein in such an amount that a suitable dosage will be ensured. Ordinarily the preparations should not contain less than about 0.01% of the active basic pyrrolidine. The preferred amount of orally administered preparations, such as tablets, powders, and the like, is between about 0.01% and about 50% and preferably between about 5% and about 30% of the active compound i.e., between about 20 mg. and about 80 mg. About 30 mg. per tablet weighing 0.2 g. have proved to be especially useful.

The high order of activity of the active agents of the present invention, as evidenced by tests in lower animals is indicative of utility. It will be clearly understood that the distribution and marketing of any compound or composition falling within the scope of the present invention for use in human beings will of course have to be predicated upon prior approval by governmental agenies, such as the Federal Food and Drug Administration, which are responsible for and authorized to pass judgment on such questions.

Various modifications and equivalents will be apparent to one skilled in the art and may be made in the compounds, compositions, and methods of the present inven-

What is claimed is:

1. A member selected from the group consisting of a basic substituted pyrrolidine of the formula:

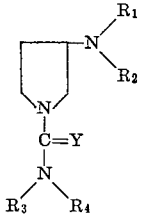

wherein $R_1$ is a member selected from the group consisting of hydrogen, lower alkyl and lower alkanoyl having one to four carbon atoms; $R_2$ is a member selected from the group consisting of lower alkyl, phenyl and o-methoxyphenyl; each of $R_3$ and $R_4$ is a member selected from the group consisting of hydrogen, lower alkyl, and phenyl and wherein $R_3$ and $R_4$ taken together with the adjacent nitrogen is a heterocyclic ring selected from the group consisting of piperidino, pyrrolidino, piperazino, morpholino, 1-tetrahydroquinilolino; Y is a member selected from the group consisting of oxygen, sulfur and imino; and acid addition salts and quaternary ammonium salts thereof.

2. A compound according to claim 1 designated 1-ethylthiocarbamoyl-3-(N-methylanilino)-pyrrolidine.

3. A compound according to claim 1 designated 1-(N-butylthiocarbamoyl)-3-(N-methylanilino)-pyrrolidine.

4. A compound according to claim 1 designated 1-amidino-3-(N-methylanilino)-pyrrolidine.

5. A compound according to claim 1 designated 3-anilino-1-carbamoylpyrrolidine.

6. A compound according to claim 1 designated 3-(N-methylanilino)-1-phenylcarbamoylpyrrolidine.

7. A compound according to claim 1 designated 1-diethylthiocarbamoyl-3-(N-methylanilino)-pyrrolidine.

8. A compound according to claim 1 designated 3-anilino-1-diphenylcarbamoylpyrrolidine.

9. A compound according to claim 1 designated 3-(N-methylanilino)-1-[N-phenyl-N-(n - propyl) - carbamoyl]-pyrrolidine.

10. A compound according to claim 1 designated 1-diphenylcarbamoyl-3-(N - phenylpropionamido) - pyrrolidine.

11. A compound according to claim 1 designated 1-diphenylcarbamoyl - 3 - [N - (2 - methoxyphenyl-propionamido]-pyrrolidine.

No references cited.

ALEX MAZEL, Primary Examiner

J. TOVAR, Assistant Examiner

U.S. Cl. X.R.

260—247.1, 247.2, 247.5, 268, 286, 287, 288, 293, 293.4, 294, 326.83, 326.86; 424—248, 250